(No Model.) 2 Sheets—Sheet 1.
S. B. ARMENT.
LAWN MOWER GRASS RECEPTACLE.
No. 474,804. Patented May 17, 1892.
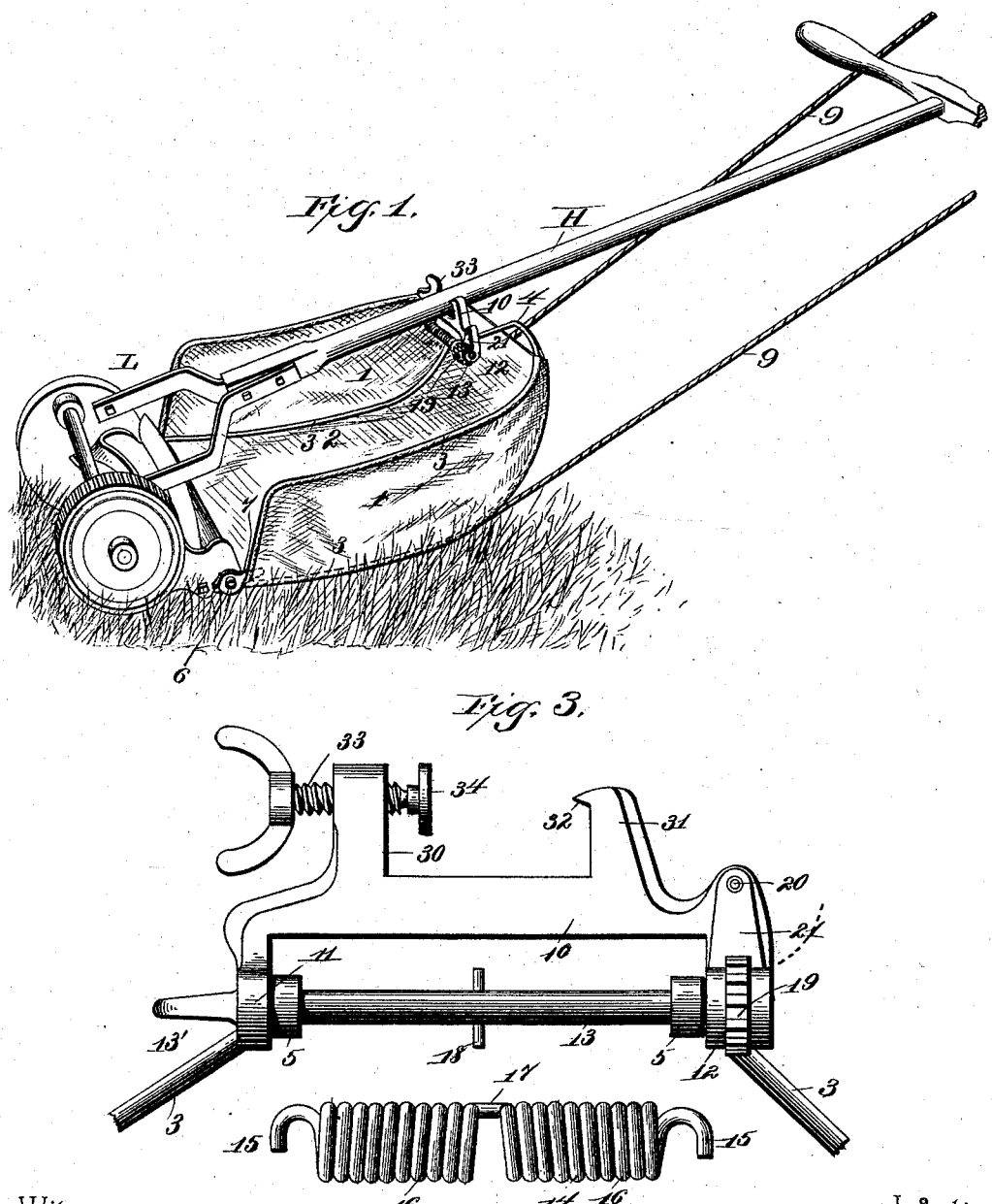
Witnesses
E. C. Wiedeman
N. J. Collamer
Inventor
S. B. Arment.
By his Attorneys,
C. A. Snow & Co.

(No Model.) 2 Sheets—Sheet 2.
S. B. ARMENT.
LAWN MOWER GRASS RECEPTACLE.
No. 474,804. Patented May 17, 1892.
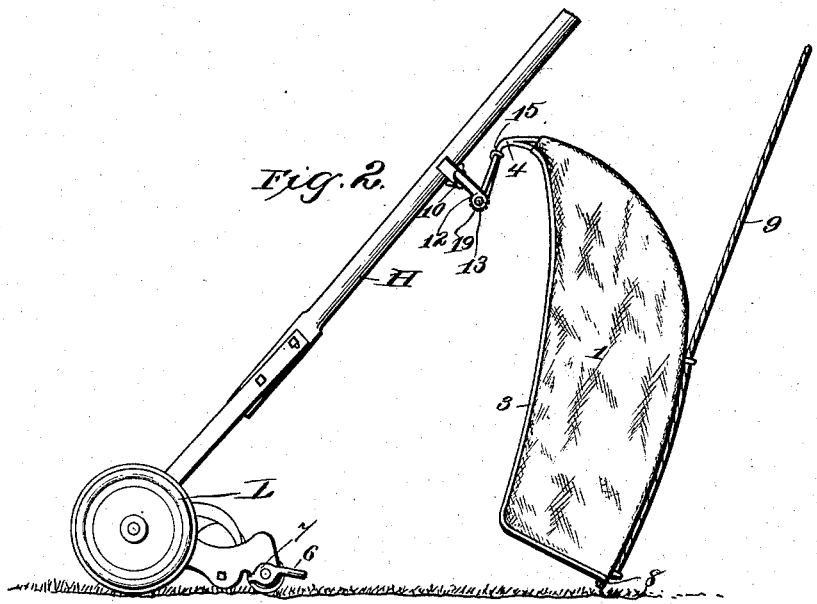
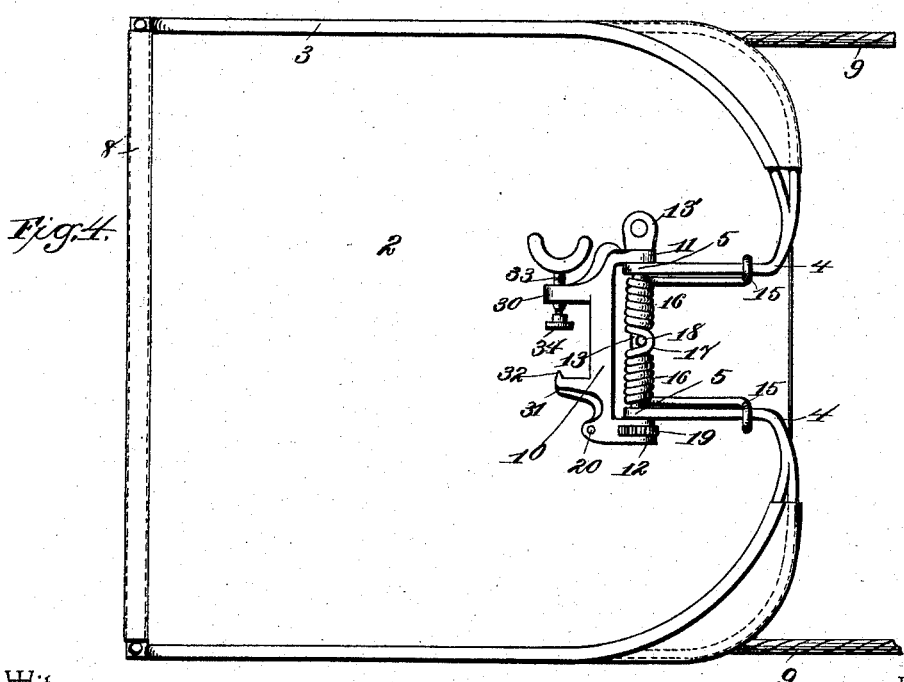
Witnesses Inventor
By his Attorneys, S. B. Arment

UNITED STATES PATENT OFFICE.

SAMUEL B. ARMENT, OF BLOOMSBURG, PENNSYLVANIA.

LAWN-MOWER GRASS RECEPTACLE.

SPECIFICATION forming part of Letters Patent No. 474,804, dated May 17, 1892.

Application filed October 19, 1891. Serial No. 409,171. (No model.)

*To all whom it may concern:*

Be it known that I, SAMUEL B. ARMENT, a citizen of the United States, residing at Bloomsburg, in the county of Columbia and State of Pennsylvania, have invented a new and useful Lawn-Mower Attachment, of which the following is a specification.

This invention relates to lawn-mowers; and the object of the same is to produce an improved attachment for lawn-mowers, whereby the grass cut thereby will be collected and harvested.

To this end the invention consists in a device of this character capable of detachable connection with an ordinary lawn-mower, and provided with means whereby it may be dumped, all as hereinafter more fully described and claimed, and as illustrated on the two accompanying sheets of drawings, wherein—

Figure 1 is a general perspective view of a lawn-mower with my attachment applied. Fig. 2 is an enlarged central longitudinal section of the attachment when dumped, showing, also, the lawn-mower and a part of the handle of the lawn-mower. Fig. 3 is a still further enlarged front elevation of the upper member or bracket, showing its spring removed from the shaft. Fig. 4 is a plan view of the attachment complete.

Referring to the said drawings, the letter L designates a lawn-mower of any approved pattern having an operating-handle H, by which it may be pushed over the lawn to cut the grass thereof.

The present invention consists in providing a receptacle which may be sold as an article of manufacture and can be readily attached to any of the standard lawn-mowers now in use, so that the grass which is cut shall be thrown into said receptacle and be collected thereby.

A further object of the invention is to provide means whereby the attachment may be dumped, when desired, without removal from the lawn-mower and without even stopping the operation thereof.

These objects I accomplish by the construction of my attachment described below.

1 1 designate the sides of the main or lower member of my attachment, and 2 is the bottom thereof.

3 are wire rods forming a frame-work on which the bodies of the sides and bottom are stretched, said bodies being of canvas, burlap, &c. The member thus formed is of the shape of a scoop open at its front end and top, and the rods 3 along the upper and lower edges of the sides are continued to the rear, turned upward and inward, and then bent forward at 4 and terminate in eyes 5 standing above the said scoop, as seen.

6 are spurs, each of which has an eye 7, whereby it is adapted to be secured on one of the transverse shafts at the rear of the lawn-mower L, as seen, the bodies of these spurs projecting above the front edge 8 of the body, which is preferably turned over a metallic strip, as seen in Fig. 2.

9 are cords or ropes connecting with the front lower corners of the body, passing beneath the same and extending for some distance to the rear, for a purpose to appear hereinafter.

The upper member or bracket (best seen in Fig. 3) comprises an inverted-U-shaped body 10, having eyes 11 and 12 at its ends, a shaft 13, passing through these eyes and through the eyes 5, above mentioned, whereby the members are pivotally connected.

14 is a strong spring, whose ends 15 are hooked and rest upon the upper sides of the forward bends 4 of the rods, whose body makes two coils 16 around the shaft 13, and whose center is looped, as at 17, around a pin 18, removably passed through the center of the shaft. Secured on one end of the shaft is a ratchet-wheel 19, turning adjacent one of the eyes in the upper member, this eye being preferably double, as shown at 12, so that the gear can turn within it; and pivoted at 20 to the body of the member is a pawl 21, adapted to turn between two of the teeth on this ratchet-wheel.

On the upper side of the member just described are two lugs 30 and 31, the latter preferably having an inturned lip 32, as seen, and through the former passes a set-screw 33, having a swiveled button 34 on its inner end. I do not limit myself to this specific means for connecting the upper member with the handle H, although I prefer it.

In use the handle H is inserted between the lugs 30 and 31, the lip 32 passing slightly above the handle, as will be clear, and the set-screw 33 is turned to bear the button 34 against the opposite side of the handle. The spurs above mentioned are also secured to the head of the lawn-mower, as described. The pin 18 is inserted and a wrench is applied to the head 13' of the shaft. The latter is then turned to the rear to tighten the coils of the spring, and when sufficient tension has been imparted thereto the pawl 21 is engaged with the gear 19 to prevent a retrograde movement of the shaft. In this condition of parts the ends 15 of the spring will bear down on the forward bends 4 of the rod 3 and will turn the lower member or scoop forward so as to throw its front end or mouth upward against the under side of the spurs 6. The lawn-mower is then pushed over the lawn, and the grass as it is cut will fly from the mower directly into the scoop and be collected thereby. At the end of each trip across or around the lawn it becomes desirable to dump the accumulated grass, and this is accomplished by simply raising the handle a trifle and pulling on one or both of the cords 9, as seen in Fig. 2. The scoop is thereby caused to turn around its pivotal connection with the bracket, its mouth just clearing the ground, and the grass will flow out of the scoop into a pile. The attachment thus serves the purpose of a rake and a harvester, gathering the grass as fast as it is cut and dumping it in piles where desired.

It is to be understood that this attachment is to be made in various sizes, so that it may be applied to lawn-mowers of different makes and dimensions. However, it will not be usually necessary to vary the size of parts other than the width of the mouth, and even this need not always be changed, as a wider mouth could travel in rear of a narrower lawn-mower. If there should be no bolts on the lawn-mower convenient for the reception of the eyes of the spurs, the latter may be secured by rivets or bolts passed through small holes, which can be easily bored in the frame-casting of the mower. I do not limit myself to the exact details of construction nor to the size, proportions, or materials of parts, as considerable change may be made therein without departing from the spirit of my invention.

What is claimed as new is—

1. An attachment for lawn-mowers, consisting of a scoop-shaped receptacle, a bracket detachably connected with the handle of the mower, a pivotal connection between said bracket and the rear end of the receptacle, and spurs on the mower-head with which the mouth of said receptacle contacts.

2. An attachment for lawn-mowers, comprising a scoop-shaped receptacle, a bracket connected with the handle of the mower, a pivotal connection between said bracket and the rear end of the receptacle, a spring turning the receptacle forward around its pivot, and spurs on the mower-head against whose under sides the front end of the receptacle normally rests.

3. An attachment for lawn-mowers, comprising a scoop-shaped receptacle consisting of a wire frame having fabric sides and bottom and open at its front and top, the frame rising above the rear end of the receptacle and extending thence forward and terminating in eyes, a pivotal connection between said eyes and the handle of the mower, a spring turning the receptacle forward around its pivot, and spurs on the ends of the mower-head projecting to the rear and against whose under sides the mouth of the receptacle normally rests.

4. An attachment for lawn-mowers, comprising a scoop-shaped receptacle having eyes at its rear end, a bracket connected with the handle of the mower and having eyes at its ends, a shaft through the eyes of both members, a pin through said shaft, a spring coiled on the shaft with its center behind the pin and its ends bearing the lower member forward around said shaft, spurs on the mower-head against whose under sides the front end of the receptacle rests, and cords secured to the receptacle and extending in the rear.

5. The combination, with a scoop-shaped receptacle having eyes at the rear end of its body, a bracket detachably secured to a lawn-mower handle and having depending eyes standing outside those of the receptacle, one of said depending eyes being double, spurs on the mower-head against which the lower end of the receptacle abuts, and cords on this receptacle leading to the rear, of a shaft through the aligned eyes, one end of the shaft being squared, a ratchet-wheel fast on the shaft within said double eye, a pivoted pawl adapted to engage said ratchet-wheel, and a spring secured to the shaft and to the receptacle.

6. An attachment for lawn-mowers, consisting of a scoop-shaped lower member, a bracket detachably connected with the handle of the mower, and a pivotal connection between said bracket and the rear end of the receptacle.

7. An attachment for lawn-mowers, comprising a scoop-shaped lower member, a bracket connected with the handle of the mower, a pivotal connection between said bracket and the rear end of the receptacle, and a spring turning the receptacle forward around its pivot.

In testimony that I claim the foregoing as my own I have hereto affixed my signature in the presence of two witnesses.

SAMUEL B. ARMENT.

Witnesses:
J. SIMPSON KLINE,
S. F. PEACOCK.